United States Patent
Li

(10) Patent No.: US 7,539,236 B2
(45) Date of Patent: May 26, 2009

(54) METHOD FOR MULTI-USER DEMODULATION WITH VARIABLE SPREAD SPECTRUM COEFFICIENT

(75) Inventor: Feng Li, Beijing (CN)

(73) Assignee: Da Tang Mobile Communications Equipment Co., Ltd., Beijing (CN)

(*) Notice: Subject to any disclaimer, the term of this patent is extended or adjusted under 35 U.S.C. 154(b) by 764 days.

(21) Appl. No.: 11/125,612

(22) Filed: May 10, 2005

(65) Prior Publication Data

US 2005/0237986 A1    Oct. 27, 2005

Related U.S. Application Data

(63) Continuation of application No. PCT/CN2003/000960, filed on Nov. 13, 2003.

(30) Foreign Application Priority Data

Nov. 13, 2002    (CN) ................................ 02 1 48623

(51) Int. Cl.
    *H04B 1/00*    (2006.01)
(52) U.S. Cl. ...................................... 375/147
(58) Field of Classification Search ................ 375/136, 375/147, 148, 149, 316, 324, 342, 441, 479
    See application file for complete search history.

(56) References Cited

U.S. PATENT DOCUMENTS

| | | | |
|---|---|---|---|
| 6,192,042 B1 | 2/2001 | Seo | 370/342 |
| 6,646,993 B1* | 11/2003 | Davies et al. | 370/252 |
| 7,177,345 B2* | 2/2007 | Kim | 375/144 |
| 2002/0136278 A1 | 9/2002 | Nakamura et al. | 375/148 |

FOREIGN PATENT DOCUMENTS

| | | |
|---|---|---|
| JP | 2002-290275 | 10/2002 |
| WO | WO 01/22610 A1 | 3/2001 |
| WO | WO 01/50620 A1 | 7/2001 |

OTHER PUBLICATIONS

International Search Report in PCT/CN03/00960 dated Feb. 26, 2004.

* cited by examiner

*Primary Examiner*—Sam K Ahn
(74) *Attorney, Agent, or Firm*—Marshall, Gerstein & Borun LLP

(57) ABSTRACT

A multiuser demodulation method with variable spreading factor may use the multiuser detection and variable spreading factor techniques in the same system at the same time without increasing the demodulation computation volume or the system time-delay. At the receiving side, the method may include: taking a low spreading factor to demodulate the received signals with the multiuser detections and obtaining intermediate demodulation results of the Transport Format Combination Indicator (TFCI) data and of the user data; demodulating the intermediate demodulation result of the TFGI data with a fixed spreading factor or a variable spreading factor; obtaining a real spreading factor from the demodulated intermediate demodulation result of the TFCI data; and processing the intermediate demodulation result of the user data with the real spreading factor to obtain the final received user data.

7 Claims, 2 Drawing Sheets

US 7,539,236 B2

METHOD FOR MULTI-USER DEMODULATION WITH VARIABLE SPREAD SPECTRUM COEFFICIENT

CROSS-REFERENCE TO RELATED APPLICATION

This is a continuation of copending International Application No. PCT/CN2003/000960, filed Nov. 13, 2003, the entire disclosure of which is incorporated herein by reference.

BACKGROUND OF THE INVENTION

1. Field of the Technology

The invention relates to a demodulation technology, such as multiuser detection or Rake receiver, in the CDMA cellular mobile communication system; more specifically, to a multiuser detection method or other demodulation method at the receiving side, such as Rake receiver, wherein the method is used in a communication system that has a variable spreading factor at the transmitting end. The method of the invention relates to a technique that indicates the bit of physical code channel and spreading factor for the current frame (currently demodulated frame), such as the Transport Format Combination Indicator (TFCI) technique in a third generation mobile communication system.

2. Related Technology

When designing a cellular mobile communication system, it is considered that how to use the limited radio resources as much as possible and how to provide the subscribers with more and better services.

Comparing with the Rake receiver technique, the multiuser detection technique can raise system performance obviously, and its spectrum efficiency is almost double, so the system capacity is raised. Multiuser detection is divided into two ways: the Interference Cancellation (IC) and the Joint Detection (JD), and either utilizes the user code channel estimation result to demodulate the desired user signal and to eliminate other user signals. Therefore, one pre-condition should be satisfied before using the multiuser detection is that the information about the transmitting side, such as the physical code channel, the spreading factor (SF) and the training sequence etc., need to be known.

Nevertheless, in a real system, especially when a technique that directly indicates the physical code channel and spreading factor of current frame used, such as TFCI in a third generation (3G) mobile system, a transmitted data size changes one frame to another along with the data size generated at the transmitting source. This means that the transmitted data size is non-constant, so the physical code channel and spreading factor used by each user in every Transmission Time Interval (TTI) are changed too, and the receiving side does not know before processing which physical code channel and spreading factor are used at the transmitting side for the user. Usually, it is impossible to use the multiuser detection directly.

One of the solutions is that the receiving side buffers all data sent by the transmitting side in one TTI, and after demodulating the TFCI data of transmitting side, the receiving side demodulates the TTI data. There are four disadvantages of this solution:

1. A large buffer is needed for storing the whole TTI received data;

2. The TFCI data needs to be demodulated first (when the physical code channel and spreading factor are unchanged and known), and it is better to take the multiuser detection to demodulate the TFCI data, otherwise the system performance will be worse because of bad TFCI data demodulation result; so the multiuser detection is used twice: one for the TFCI data and one for the demodulated data, so the computation volume is almost double;

3. The receiving side can demodulate only after a whole TTI data have been received; since the TTI and the physical frame time interval are not equal, for example in a TD-SCDMA system the physical frame time interval is 5 ms and the TTI is possibly 10 ms, the receiving side must wait 10 ms and then makes the demodulation; this will delay the signal processing much longer, and cannot satisfy within the 150 ms delay requirement from terminal to terminal;

4. When directly indicating the current frame physical code channel and spreading factor technique is used, such as TFCI in the 3G, for a variable spreading factor case, it is necessary to look for a blind detection method, and for a fixed spreading factor case, it takes too many bits for indicating the current frame physical code channel and spreading factor, and the net payload bits for transmitting in a frame are too small.

At present, in 3G except TD-SCDMA, other systems use the fixed spreading factor.

The 3GPP has defined the TFCI used in a physical code channel. The TFCI is some physical parameters with very high processing gain, and they are transferred in each TTI to indicate its channel-coding scheme, interleaving and holing pattern etc. With these parameters, the current physical frame spreading factor and the code channel occupied situation can be derived. For example, N code channels have allocated to the users, and among them M code channels are needed to be occupied at an instance, M<=N; from the TFCI data, the demodulation side can derived that M code channels are occupied, and the spreading factor of the M code channels is defined in the standard in advance.

When the wireless link of a user has been established, which physical resources that can be used by this user are defined. Suppose the spreading factor of a user is $SF_4^0$ (four is the code length of the SF, and the $0^{th}$ code channel is used), the user can use the spectrum resources drawn from the $SF_4^0$, which is shown by real lines after the $SF_4^0$ in the code tree in FIG. 1.

When the user transmits many data, a code channel with spreading factor 4 ($SF_4^0$) is taken; when a small amount of data is transmitted, one code channel with spreading factor 8 ($SF_8^0$) and one code channel with spreading factor 16 ($SF_{16}^2$) are taken; when a smaller amount of data is transmitted, only one code channel with spreading factor 8 ($SF_8^0$) is taken; and when a smallest amount of data is transmitted, only one code channel with spreading factor 16 ($SF_{16}^0$) is taken. This is the variable spreading factor technique. In each situation mentioned above, which code channel is used is defined in the standard (for description, in this document the code channels shown in above parentheses are taken).

When a smaller amount of data is transmitted, the transmitting side can take larger spreading factor. Since the spreading factor is larger, the processing gain is larger too; so the transmitting power can be smaller. Therefore, on the one hand, the transmitting power is saved (This is useful for a terminal: if voice takes 50% of the transmitting side power, then with this method the transmitting side power can save 25%), and on the other hand, interference to other users is reduced. So, the whole system performance is raised.

It has been seen from the above analysis that the multiuser detection and TFCI techniques are very important. The TFCI indicates the channel-coding scheme, interleaving and holing pattern etc. for the current TTI (10, 20, 40 or 80 ms), but in a physical frame (it is 5 ms for TD-SCDMA) the physical code channel and spreading factor used by a user are unknown, so it is required that the receiver must adaptively detect the variable code channel. Nevertheless, the multiuser detection technique uses the code channel estimation result to make either Interference Cancellation or Joint Detection, but there is a pre-condition that the physical code channel and spreading factor of current frame for all users have been known. Obviously, this is a conflict.

GENERAL DESCRIPTION OF THE INVENTION

The invention provides a multiuser demodulation method for variable spreading factor, and the method uses the multiuser detection and variable spreading factor at the same time. The method uses a signal processing procedure, through which the multiuser detection and TFCI can be used in the system at the same time without increasing the system computation volume and time-delay.

The technical scheme that implements the objective of the invention is shown in the following: A multiuser demodulation method for the variable spreading factor, comprising:

A. Demodulating received signals with a low spreading factor using the multiuser detection technique, and obtaining intermediate demodulation result of a TFCI data and intermediate demodulation result of a user data;

B. Demodulating intermediate demodulation result of the TFCI data with a fixed spreading factor or a variable spreading factor;

C. Obtaining a real spreading factor from the demodulated TFCI data intermediate result;

D. Processing the intermediate demodulation result of the user data with the real spreading factor to obtain the final received user data.

When the spreading factor of the TFCI data is fixed, wherein, the Step B is:

Demodulating intermediate demodulation result of the TFCI data with a fixed spreading factor, the fixed spreading factor is unchanged when the low spreading factor used in Step A is changed.

When the spreading factor of the TFCI data is variable, but the TFCI data position is non-fixed, and possibly the TFCI data and user data are interleaved, wherein, the Step B is:

Demodulating intermediate demodulation result of the TFCI data with a given spreading factor.

When a variable spreading factor is taken to demodulate the TFCI data, and the TFCI data position is non-fixed, and the TFCI data and user data are not interleaved; wherein, the Step B is:

Demodulating intermediate demodulation result of the TFCI data with a blind detection.

The invention proposes a new signal processing procedure at the receiving side. In this signal processing procedure, since the multiuser detection technique is used, the system demodulation performance is not degraded; and since it processes signal directly without waiting the demodulation result of indication for the physical code channel and spreading factor of the current frame, so it need not have a huge buffer to store the whole TTI original data, and needs only one time to use the multiuser detection. Therefore, the computation volume and computation time are saved. Comparing with the situation that demodulates a fixed user physical code channel and spreading factor, the computation volume is almost the same, but the receiving side supports that the transmitting side can change the physical code channel and spreading factor more freely.

EMBODIMENTS OF THE INVENTION

The invention will be described in more detail with reference to drawings and an embodiment.

The method of the invention is a processing procedure for receiving signal that uses multiuser detection and variable spreading factor techniques at the same time.

In a variable spreading factor system, a high spreading factor is definitely derived from the low spreading factor. It takes the following formula:

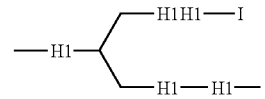

Therefore, each son spreading factor is constituted by the father spreading factor, for example:

$SF_4^0 = [1\ 1\ 1\ 1]$ $SF_8^1 = [1\ 1\ 1\ 1\ -1\ -1\ -1\ -1] = [SF_4^0\ -SF_4^0]$ $SF_{16}^3 = [1\ 1\ 1\ 1\ -1\ -1\ -1\ -1\ -1\ -1\ -1\ -1\ 1\ 1\ 1\ 1] = [SF_4^0\ -SF_4^0\ -SF_4^0]$.

With this feature, when a user uses which spreading factor is unknown, a low spreading factor is used first to demodulate the received data of the user. After the TFCI data have been demodulated, the real spreading factor is obtained according to the demodulated TFCI data; finally the received data can be obtained by the real spreading factor.

Figure 1:
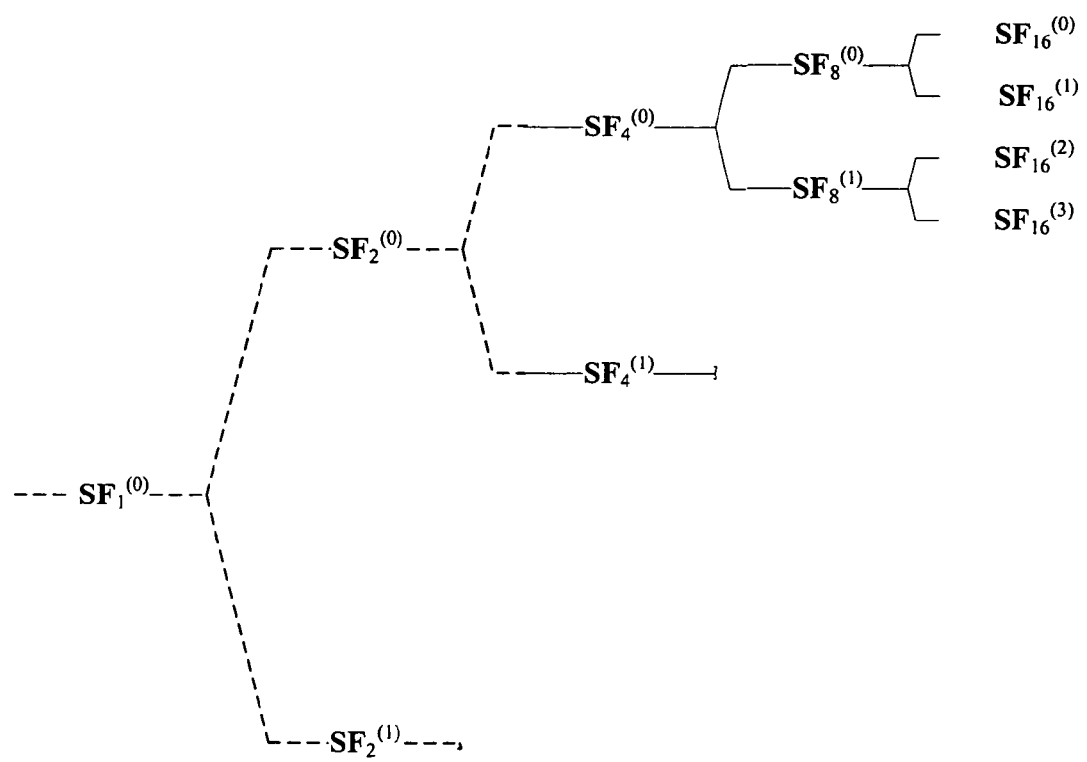
FIG. 1 shows a code-tree of the spreading factor.
Figure 2:
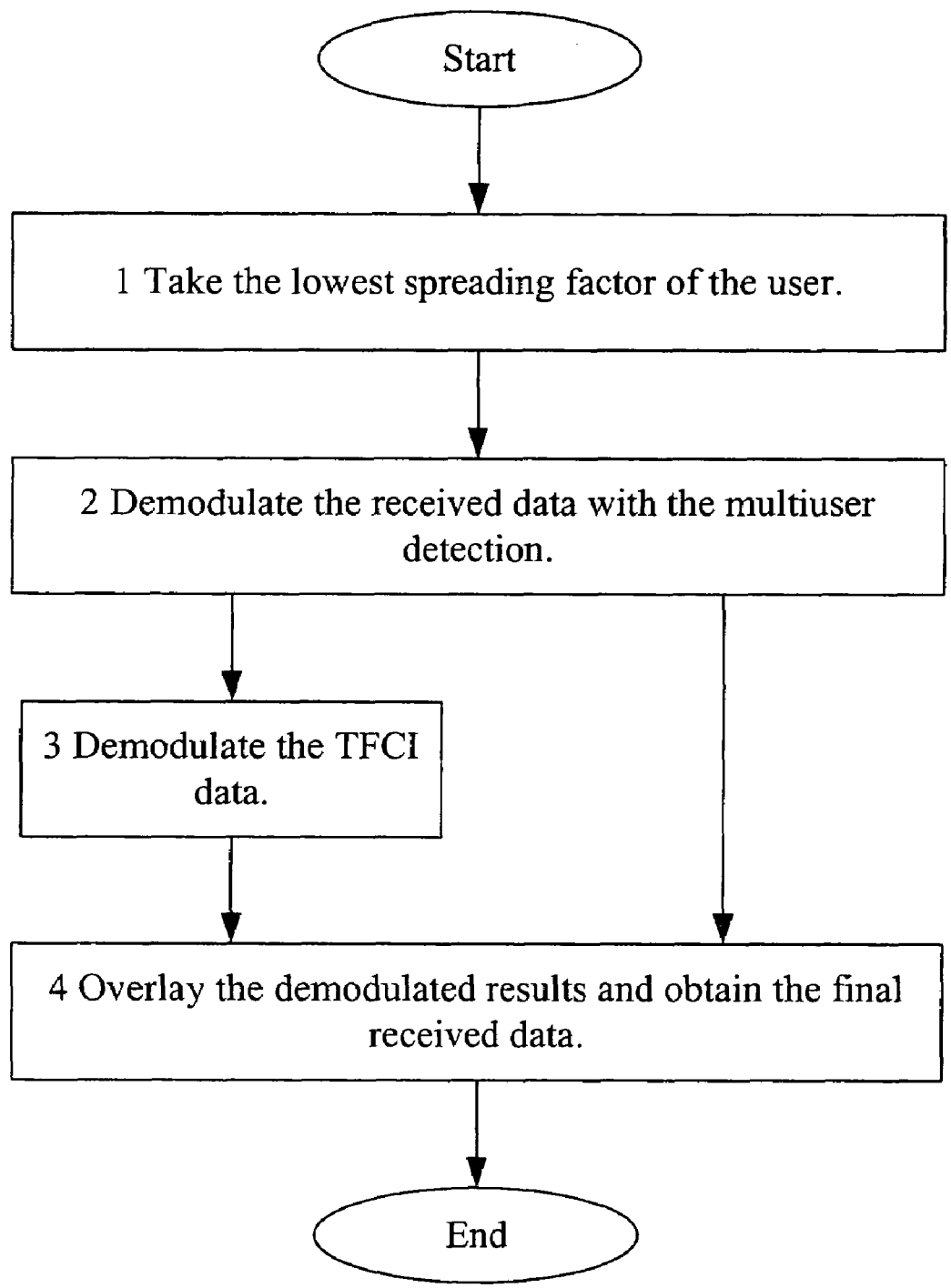
FIG. 2 shows a signal-processing flowchart of the invention method when multiuser detection and variable spreading factor techniques are used at the same time.

FIG. 2 shows the signal-processing flow chart of the method, and it has four steps:

Step 1. Take the lowest spreading factor of the user, and suppose that this lowest spreading factor is used;

Step 2. With the multiuser detection technique, the received data of the user are demodulated by the lowest spreading factor to obtain the intermediate demodulation result of TFCI data and the intermediate demodulation result of user data;

Step 3. Demodulate the intermediate demodulation result of TFCI data;

Step 4. Based on the demodulated TFCI data, the real spreading factor is obtained, and making overlay processing to the user data intermediate demodulation result obtained in Step 2 with the real spreading factor, the final user received data are obtained.

In the following, an embodiment of this method is described, which takes three steps.

First Step. Suppose that the activated code channel for the user is $SF_4^0$, and a frame takes one SF 8 ($SF_8^0$) code channel and one SF 16 ($SF_{16}^2$) code channel. At the receiving side, it is supposed that the user takes the low spreading factor $SF_4^0$ to transmit the information and the receiver takes the low spreading factor to make multiuser detection. This is feasible, the reasons are:

$SF_8^0 = [1\ 1\ 1\ 1\ 1\ 1\ 1\ 1] = [SF_4^0\ SF_4^0]$.

$SF_{16}^2 = [1\ 1\ 1\ 1\ -1\ -1\ -1\ -1\ 1\ 1\ 1\ 1\ -1\ -1\ -1\ -1] = [SF_4^0\ -SF_4^0\ SF_4^0\ -SF_4^0]$.

It is seen that the $SF_8^0$ or $SF_1^2$ can be constituted by the $SF_4^0$, i.e. the lower spreading factor derives out the high spreading factors, or the father spreading factor constitutes the son spreading factors.

Second Step. Demodulate the TFCI data to obtain its intermediate demodulation result, and it can take either variable spreading factor or fixed spreading factor. All three demodulation situations are given below.

Suppose taking $SF_4^0$ to demodulate the TFCI data, and the intermediate demodulation result is ($d_{TFCI}1$, $d_{TFCI}2$, $d_{TFCI}3 \ldots d_{TFCI}m$), wherein m is the length of the intermediate demodulation result when taking the spreading factor 4 to demodulate the TFCI data.

First situation takes fixed spreading factor to demodulate the TFCI data, for example always taking $SF_{16}^2$ to demodulate TFCI data without changing with actual SF changing, then:

$$TFCI_k = (d_{TFCI}(4k-3) - d_{TFCI}(4k-2) + d_{TFCI}(4k-1) - d_{TFCI}(4k))/4,$$

Wherein the range of k is (1 ... m/4).

Second situation takes a variable spreading factor to demodulate the TFCI data, but the position of the TFCI data is non-fixed; it is possible that the TFCI data and the user data are interleaved. Since the spreading factor for TFCI data is unknown beforehand, so suppose that the spreading factor for TFCI data is $SF_4^0$:

$$TFCI_k = d_{TFCI}(4k-3),$$

Wherein the range of k is (1 ... m/4).

In this case, the TFCI data at transmitting side must be mapped to an appropriate position (The TFCI data position is known), in other word, it is possible that the TFCI data and user data are interleaved.

The third situation takes variable spreading factor to demodulate the TFCI data, but the position of the TFCI data is also non-fixed, and the TFCI data and user data are not interleaved. Since the spreading factor for TFCI data is unknown beforehand, and the position of the TFCI data is unknown too, so it takes blind detection for the TFCI data. The specific procedure is as follows:

Suppose to take the spreading factor 4, 8 and 16 to demodulate the TFCI data, respectively, and obtain the results. Since the TFCI data indicates the channel-coding scheme, interleaving and holing pattern etc. of the current TTI code channels, the spreading factor and the code channel occupied by the current TTI can be obtained with the demodulation of the TFCI data. When the obtained spreading factor equals to the supposed spreading factor, the current real spreading factor for the TFCI is determined.

Third Step. From the demodulation result of the TFCI data, obtaining the spreading factor and the code channel occupied by the current TTI, and with them the user data is demodulated. For example, from the demodulation result of the TFCI data, it is known that the current user data takes a spreading factor 8 code channel ($SF_8^0$) and a spreading factor 16 code channel ($SF_{16}^2$).

Suppose in the 16 chips the code channel $SF_{16}^2$ transmits data $C_{16}^1$, and the code channel $SF_8^0$ transmit data $C_8^1$ and $C_8^2$.

Demodulate user data with $SF_4^0$ directly the results are $S_4^1$, $S_4^2$, $S_4^3$, $S_4^4$.

There are the following relationships:

$$C_{16}^1 + C_8^1 = S_4^1;$$

$$-C_{16}^1 + C_8^2 = S_4^2;$$

$$C_{16}^1 + C_8^2 = S_4^3;$$

$$-C_{16}^1 + C_8^2 = S_4^4.$$

Therefore, $$C_8^1 = (S_4^1 + S_4^2)/2;$$

$$C_8^2 = (S_4^3 + S_4^4)/2;$$

$$C_{16}^1 = (S_4^1 - S_4^2 + S_4^3 - S_4^4)/4.$$

The $C_8^1$, $C_8^2$ and $C_{16}^1$ are the final demodulation result of the received user data.

The main computation volume of demodulation is to demodulate the $S_4^1$, $S_4^2$, $S_4^3$, $S_4^4$ for each physical frame, it takes about 99% of the whole computation volume. Since the computation of the $S_4^1$, $S_4^2$, $S_4^3$, $S_4^4$ need not wait the demodulation result of the TFCI data, every physical frame (for TD-SCDMA, it is 5 ms) can compute independently. Later, when computing the $C_8^1$, $C_8^2$, $C_{16}^1$, it is necessary to have the demodulation result of TFCI data, but the computation volume of them is very small. Therefore, with the method of the invention, the multiuser detection and variable spreading factor techniques are successfully used in the same system without increasing the system computation volume and time delay.

The invention claimed is:

1. A multiuser demodulation method for a variable spreading factor, the method comprising:
   A. receiving signals in a receiver and demodulating the received signals with a low spreading factor using a multiuser detection technique, and obtaining an intermediate demodulation result of Transport Format Combination Indicator (TFCI) data and an intermediate demodulation result of user data;
   B. demodulating the intermediate demodulation result of the TFCI data with a fixed spreading factor or a variable spreading factor;
   C. obtaining a real spreading factor from the demodulated TFCI data intermediate result; and
   D. processing the intermediate demodulation result of the user data with the real spreading factor to obtain final received user data.

2. The multiuser demodulation method of claim 1, wherein the low spreading factor in A comprises taking the lowest spreading factor of a user.

3. The multiuser demodulation method of claim 1, wherein the spreading factor of the TFCI data is fixed, and wherein B comprises:
   demodulating the intermediate demodulation result of the TFCI data with the fixed spreading factor, the fixed spreading factor being unchanged when the low spreading factor used in A is changed.

4. The multiuser demodulation method of claim 1, wherein the spreading factor of the TFCI data is variable, the TFCI data position is non-fixed, and the TFCI data and the user data are interleaved, wherein B comprises:
   demodulating the intermediate demodulation result of the TFCI data with a given spreading factor.

5. The multiuser demodulation method of claim 1, wherein the variable spreading factor is taken to demodulate the TFCI data, the TFCI data position is non-fixed, and the TFCI data and the user data are not interleaved, wherein B comprises:
   demodulating the intermediate demodulation result of the TFCI data with a blind detection.

6. The multiuser demodulation method of claim 5, wherein demodulating the intermediate demodulation result of the TFCI data with the blind detection further comprises:
   demodulating the intermediate demodulation result of the TFCI data using a plurality of assumed TFCI spreading factors, respectively, obtaining various demodulation results of the TFCI data, obtaining spreading factors and a code channel occupied by the current Transmission Time Interval (TTI) from the demodulation results; and determining one of the obtained spreading factors that coincides with one of the assumed TFCI spreading factors as the real spreading factor.

7. The multiuser demodulation method of claim 1, wherein D comprises overlay processing to the intermediate demodulation result of the user data obtained in A with the real spreading factor, and obtaining the final received user data.

* * * * *